United States Patent
Catton et al.

(10) Patent No.: US 9,759,167 B2
(45) Date of Patent: Sep. 12, 2017

(54) CARBON CANISTER INCLUDING LIQUID SEPARATOR

(71) Applicant: Kautex Textron GmbH & Co. KG, Bonn (DE)

(72) Inventors: Piers Catton, Gosport (GB); Karsten Danielowski, Troisdorf (DE); Bjoern Stell, Bergisch Gladbach (DE); Tho Truong Huynh, Chilworth (GB)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/647,612

(22) PCT Filed: Nov. 20, 2013

(86) PCT No.: PCT/EP2013/074223
§ 371 (c)(1),
(2) Date: May 27, 2015

(87) PCT Pub. No.: WO2014/082899
PCT Pub. Date: Jun. 5, 2014

(65) Prior Publication Data
US 2015/0316008 A1    Nov. 5, 2015

(30) Foreign Application Priority Data

Nov. 28, 2012  (EP) .................................... 12008008
Nov. 29, 2012  (EP) .................................... 12008025

(51) Int. Cl.
*F02M 25/08*    (2006.01)
*B01D 53/04*    (2006.01)

(52) U.S. Cl.
CPC ..... *F02M 25/0854* (2013.01); *B01D 53/0407* (2013.01); *B01D 2259/4516* (2013.01); *F02M 2025/0863* (2013.01)

(58) Field of Classification Search
CPC .. B01D 53/002; B01D 53/04; B01D 53/0407; B01D 2259/4516; F02M 25/0854; F02M 2025/0863
(Continued)

(56) References Cited

U.S. PATENT DOCUMENTS 4,137,882 A * 2/1979 Thornburgh ....... F02M 25/0854
                                                 123/520
4,655,189 A    4/1987 Koga
(Continued)

FOREIGN PATENT DOCUMENTS

EP          0556488 A1    8/1993
EP          0899450 A2    3/1999
(Continued)

OTHER PUBLICATIONS

English language PCT International Search Report mailed Dec. 18, 2013, received in corresponding PCT Application No. PCT/EP13/74223, 2 pgs.
(Continued)

*Primary Examiner* — Frank Lawrence
(74) *Attorney, Agent, or Firm* — Grossman Tucker Perreault & Pfleger, PLLC

(57) ABSTRACT

A fuel vapor storage and recovery apparatus (1) comprising at least one main vapor storage compartment (3) filled with an adsorbent material, at least one vapor inlet port (7), at least one atmospheric vent port (8), and at least one purge port (9). The vapor inlet port (7) being connectable to a fuel tank venting line and the purge port (9) being connectable to an engine air intake line, wherein the main vapor storage compartment (3) comprises a purge buffer zone (14) as well as first vapor distribution chamber (10), wherein the first fuel vapor distribution chamber (10) includes a liquid trap.

20 Claims, 2 Drawing Sheets

Figure 1:
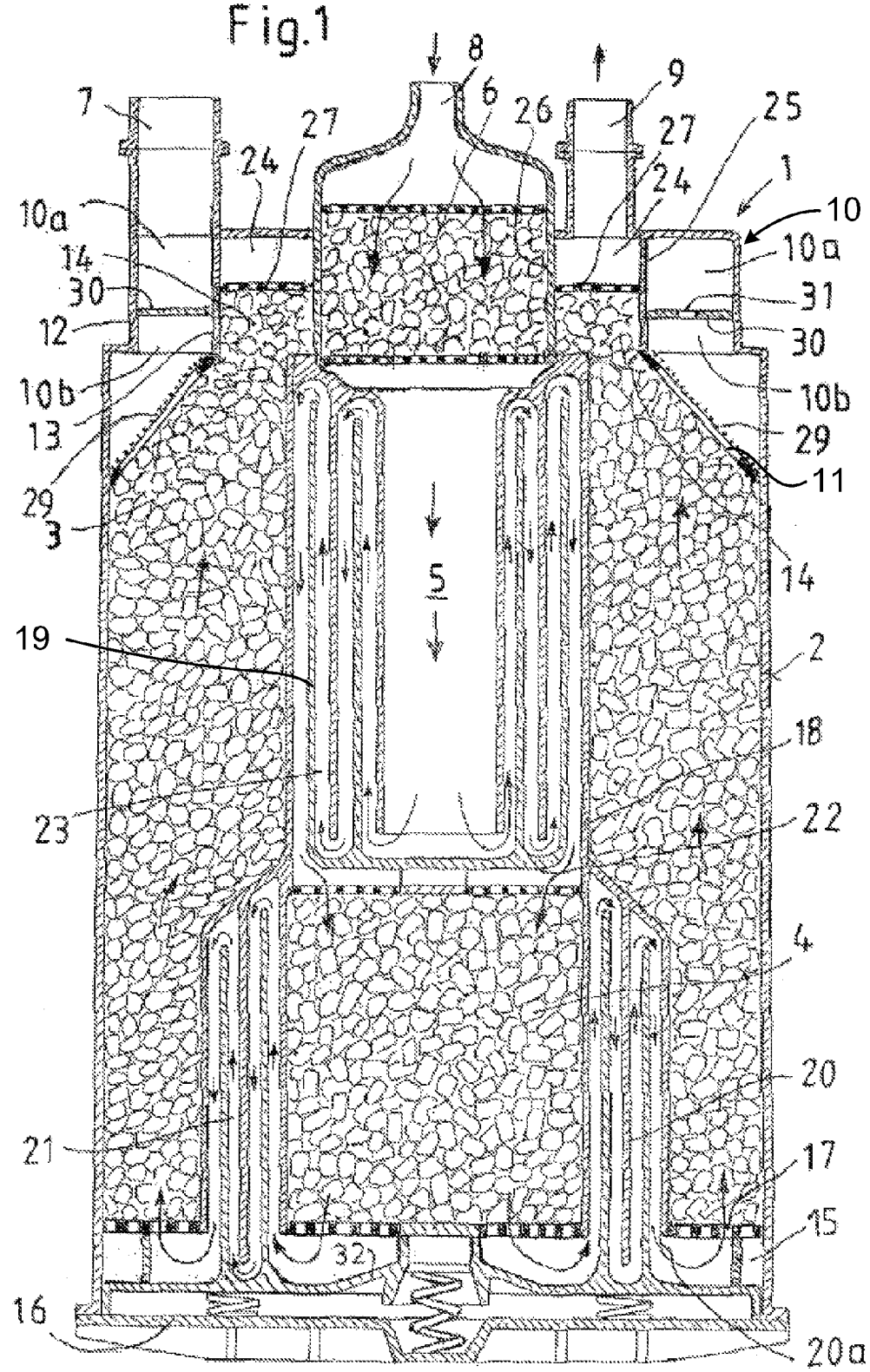

(58) Field of Classification Search
USPC ...... 96/131, 139, 147, 152; 95/146; 123/519
See application file for complete search history.

(56) References Cited

U.S. PATENT DOCUMENTS

| | | | | |
|---|---|---|---|---|
| 4,658,796 | A | * | 4/1987 | Yoshida ............. F02M 25/0854 123/516 |
| 4,894,072 | A | * | 1/1990 | Turner ............... B01D 53/0407 123/519 |
| 5,173,095 | A | * | 12/1992 | Yasukawa .......... F02M 25/0854 123/519 |
| 5,641,344 | A | * | 6/1997 | Takahashi .......... B01D 53/0415 123/519 |
| 6,589,319 | B2 | * | 7/2003 | Ikuma ................ F02M 25/0854 123/519 |
| 7,047,952 | B1 | | 5/2006 | Yamauchi et al. |
| 2009/0139495 | A1 | | 6/2009 | Crawford |
| 2009/0320806 | A1 | | 12/2009 | Lang et al. |
| 2011/0168025 | A1 | | 7/2011 | Huynh |
| 2015/0176540 | A1 | * | 6/2015 | Danielowski .... B60K 15/03504 123/519 |

FOREIGN PATENT DOCUMENTS

| | | |
|---|---|---|
| EP | 1650425 A1 | 4/2006 |
| WO | 2009080075 A2 | 7/2009 |

OTHER PUBLICATIONS

English language PCT Written Opinion mailed Dec. 18, 2013, received in corresponding PCT Application No. PCT/EP13/74223, 3 pgs.

\* cited by examiner

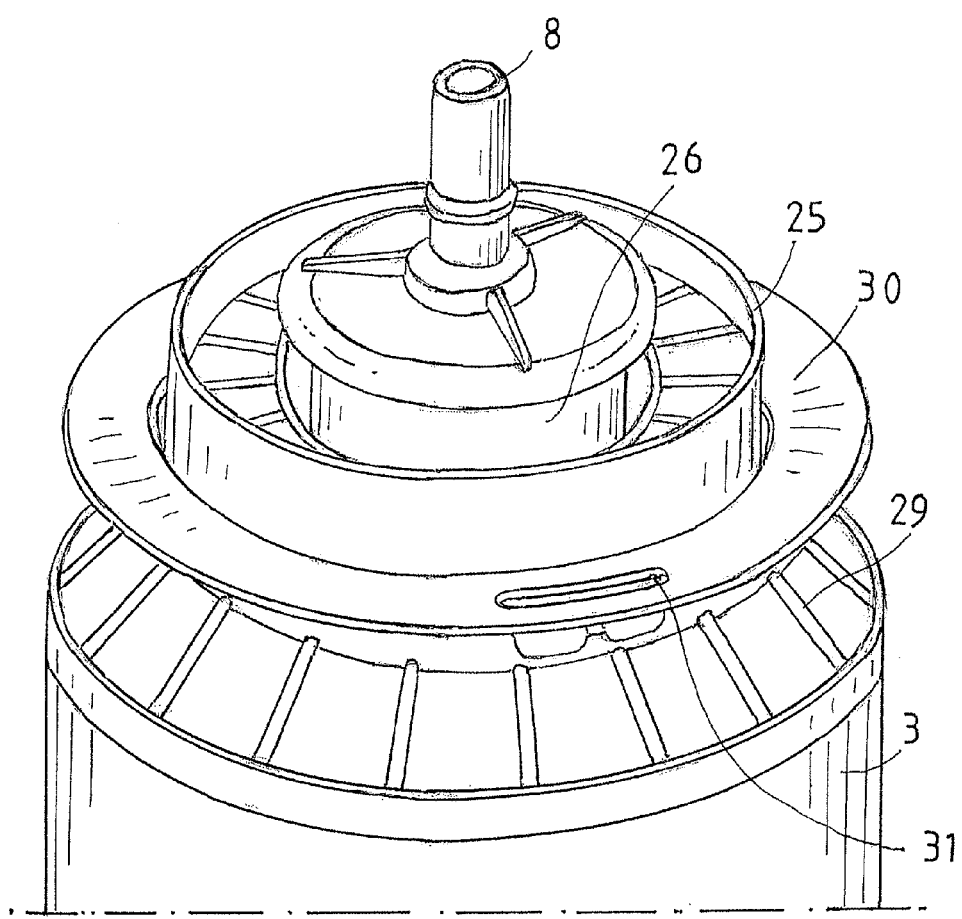

CARBON CANISTER INCLUDING LIQUID SEPARATOR

The invention refers to a fuel vapor storage and recovery apparatus including a housing defining at least one main vapor storage compartment filled with an adsorbent material, at least one atmospheric vent port and at least one purge port, said vapor inlet port being connected to a fuel tank venting line and also said purge port being connectable to an engine air intake line, wherein said main vapor storage compartment comprises a purge buffer zone.

Fuel vapor storage and recovery apparatuses of the above-referred kind are generally known in the art, and are sometimes referred to as so-called carbon canisters. The gasoline fuel used in many internal combustion engines is quite volatile. Evaporative emissions of fuel vapor from a vehicle having an internal combustion engine occur principally due to venting of fuel tanks of the vehicle. When the vehicle is parked, changes in temperature or pressure cause air laden with hydrocarbons to escape from the fuel tank. Some of the fuel inevitably evaporates into the air within the tank and thus takes the form of vapor. If the air emitted from the fuel tank was allowed to flow untreated into the atmosphere, it would inevitably carry with it this fuel vapor.

In order to prevent fuel vapor loss into the atmosphere, the fuel tank of a car is vented through a conduit to a canister containing suitable fuel adsorbent materials such as activated carbon. High-surface area granular or pelletized activated carbon material are widely used and temporarily adsorb the fuel vapor.

As carbon canisters/fuel vapor storage and recovery apparatuses have a limited adsorption capacity, carbon canisters normally have to be regenerated now and then. Regeneration is normally achieved via purging from the engine manifold, i.e. an engine air intake line draws atmospheric air backwards through the carbon canister, so that hydrocarbons are delivered to the engine for burning-off with the engine intake air.

Normally, in the very beginning of the purging operation, hydrocarbon laden gas is drawn via the fuel tank vent line through the carbon canister into the engine air intake line. As soon as the suction in the purge line/engine air intake line fully builds up, ambient air is drawn through the atmospheric vent port from the upstream end of the carbon canister towards its downstream end, i.e. from end to end, thus, regenerating the carbon bed.

In order to prevent direct purging of hydrocarbons from the fuel tank directly into the engine air intake line and thereby partially bypassing the adsorbent material within the carbon canister, it is generally known to provide a so-called purge buffer within the carbon canister. Typically, such purge buffers eliminate hydrocarbon peaks within the engine air intake stream, which occasionally causes difficulties in controlling the exhaust emission. More specifically, purge buffers within the carbon canister avoid that the engine intake mixture becomes too rich during engine start-up.

A carbon canister of the above-referred kind with a purge buffer is for instance disclosed in WO 2009/073323 A2. The fuel vapor recovery apparatus according to WO 2009/073323 A2 includes a transfer conduit configured to provide means for communicating a vacuum produced in an engine to the carbon bed in the interior region of a housing to cause a fuel vapor mixture laden with hydrocarbon material released from the carbon bed to be discharged from the interior region of the housing, so that the fuel vapor mixture can be burnt in the engine. This transfer conduit includes a siphon portal formed to include a fuel vapor outlet adapted to be coupled in a vapor delivery system coupled to an engine. The transfer conduit includes a bed siphon arranged to extend into the interior region of the housing and into the carbon bed and formed to include a primary air inlet located in the carbon bed to ensure that some fuel vapor admitted into the interior region of the housing through the outside airport must pass through the carbon bed before entering the bed siphon through the primary air inlet. The bed siphon of the transfer conduit extends downwardly into the carbon bed to locate the primary air inlet in the carbon bed along an imaginary partition line separating the carbon bed into an upper carbon bed and a lower carbon bed. Thus, any hydrocarbon-laden gas directly drawn from the vapor inlet port/tank port into the purge line must first flow through a portion of the carbon bed.

Due to the design of the transfer conduit, which extends into the carbon bed, a so-called carbon dead zone is created within the carbon bed during purging. Such carbon dead zone typically leads to a loss of its working capacity, since there is always a region of the carbon bed which is not fully purged. Due to the creation of such carbon dead zone, where the carbon remains saturated with hydrocarbons, the filtration path between the vapor inlet port/tank port to the atmospheric vent port will ultimately become shorter. This results in a partial loss of DBL (Diurnal Breathing Loss) working capacity.

Another carbon canister including a buffering activated carbon chamber which is located adjacent to a purge port of a canister and which forms a so-called purge buffer is for instance disclosed by U.S. Pat. No. 7,047,952 B1. Additionally, there is a partition plate provided between the tank port and the purge port for preventing these parts from directly communicating with each other. The carbon canister disclosed by U.S. Pat. No. 7,047,952 B1 includes a main adsorbent chamber and first and second chambers provided between the main adsorbent chamber and said purge port, one of the first and second chambers containing activated carbon, the other one of the chambers serving as an air chamber. The first and second chambers are arranged at an upstream end at the main adsorbent chamber and are in communication with each other by a passage in a buffer plate. The arrangement is such that in effect the purge buffer is arranged in a separate chamber, and the air chamber and the purge buffer are arranged side by side, such that the partition wall between the chambers also creates a carbon dead zone within the main carbon chamber.

Applicant created a design of a fuel vapor storage and recovery apparatus of the above-referred kind, comprising a purge buffer volume, which is arranged such that the built-up of dead zones within the adsorbent material during purging is minimized as far as possible.

Nevertheless, with such a design carbon dead zones within the carbon canister may not be eliminated completely.

As this is generally known in the art, the adsorption capacity of an adsorption bed is strongly affected by the ingress of liquid hydrocarbons, since fuel droplets block the microporous structure of the activated carbon, so that at least in the fuel tank venting line or upstream the vapor inlet port of the fuel vapor storage and recovery apparatus at least one liquid trap has to be provided in order to keep liquid hydrocarbons away from the carbon bed.

Liquid trap compartments or droplet separators known in the art require relatively large space.

It is thus an object of the present invention to provide a fuel vapor storage and recovery apparatus comprising a purge buffer volume, which is arranged such that at the one hand built-up of dead zones within the adsorbent material is minimized and on the other hand effective protection against ingress of fuel droplets into the adsorbent bed is provided.

These and other objects are achieved by the appended claims.

According to one aspect of the present invention, there is provided a fuel vapor storage and recovery apparatus including a housing defining at least one main vapor storage compartment filled with an adsorbent material, at least one vapor inlet port, at least one atmospheric vent port and at least one purge port, said vapor inlet port being connectable to a fuel tank venting line and said purge port being connectable to an engine air intake line, wherein said main vapor storage compartment comprises at least one first fuel vapor distribution chamber not filled with an adsorbent material, wherein said first fuel vapor storage distribution chamber is arranged hydraulically upstream said purge buffer zone and directly communicating with said fuel vapor inlet port, wherein said first fuel vapor distribution chamber includes a liquid trap.

According to yet another aspect of the present invention the fuel vapor storage and recovery apparatus may comprise a purge buffer zone.

According to the present invention, the purge buffer zone may be a part of the main vapor storage compartment, the first fuel vapor storage distribution chamber is arranged hydraulically upstream said purge buffer zone, so that this design provides an evenly distributed gas flow through the entire purge buffer zone at least during purging operation. The first fuel vapor distribution chamber is preferably a circumferentially extending chamber, which includes a liquid trap. The inventive idea is basically to provide an air distribution chamber with a dual purpose, namely on the one hand evenly distributing the gas flow through the buffer zone and on the other hand providing a liquid trap as well as a reservoir for liquid fuel.

The fact that the purge buffer zone does form part of the main vapor storage compartment in the sense of the instant application does not necessarily exclude the separation of the purge buffer zone from the main vapor storage compartment by a filter mesh, screen or the like.

The term "upstream" and "downstream" as used herein are meant to be understood relative to the described operation of the carbon canister, i.e. venting operation or purging operation. During the purging operation normally a reversed gas flow is induced within the carbon canister from the atmospheric vent port to the carbon bed towards the purge port. During venting operation a gas flow through the carbon canister is induced from the tank port towards the atmospheric vent port. In the initial phase of purging, a kind of short cut gas flow is induced from the tank port towards the purge port as long as the flow resistance through the fuel tank vent line is smaller than the flow resistance through the carbon bed of the carbon canister.

Although hereinafter sometimes the adsorption material and adsorption bed is referred to as carbon bed or carbon, a person skilled in the art will appreciate that the adsorption material may be activated carbon or any other suitable adsorbent. The adsorbent may be in the form of a bed of granular material, alternatively and/or additionally the adsorbent comprises monolithic carbon and/or other monolithic adsorbent materials.

In a particular preferred embodiment of the fuel vapor storage and recovery apparatus according to the instant application, said purge buffer zone is enclosed by said first fuel vapor distribution chamber. This allows for a very compact design of the fuel vapor storage and recovery apparatus with maximum exploitation of space. According to yet another preferred embodiment of the present invention, said liquid trap includes at least one droplet separator.

Said droplet separator may be in the form of a circumferential intermediate partition wall within said first fuel vapor distribution chamber.

Said partition wall may be simply in form of a ring welded inside the canister at any rotational position.

So, said first fuel vapor distribution chamber includes two stories, one of these stories, preferably the upper one, forms a liquid trap volume, in particular if the mounting position of the housing of the fuel vapor storage and recovery apparatus is basically horizontally, i.e. lying.

In a particularly preferred embodiment of the fuel vapor storage and recovery apparatus according to the instant application, said first fuel vapor distribution chamber includes a circumferential bottom partition wall, said partition wall sloping towards the periphery of the housing.

The term "bottom" in the above-mentioned sense is also meant hydraulically rather than referring to the mounting position of the housing.

Due to this particular design of said first fuel vapor distribution chamber, the fuel vapor distribution chamber at least partially has a kind of triangular cross-section. In this area in which the bottom partition wall creates an angle normally a carbon dead zone would be created during purging. So the design according to the instant application very effectively utilizes this space for an extension of the fuel vapor distribution chamber downstream, so that an additional liquid trap volume may be created which is fully integrated into the housing at least space requirements.

Preferably, the bottom partition wall comprises a grid or frame structure.

This grid or frame structure may support a screen, which is permeable to fuel vapor.

In the intermediate partition wall, at least one hole/cut-out may be provided, which establishes a communication between the upstream of the air distribution chamber and the downstream part of the air distribution chamber, so as to form a winding part or labyrinth for the gas entering the fuel vapor inlet port.

In the event the fuel vapor storage and recovery apparatus is to be mounted vertically, then an additional vertical wall or an additional volume for liquid fuel is provided within the fuel vapor distribution chamber. Such additional volume may be provided by a cup suspended from the intermediate partition wall.

In yet another embodiment, the fuel vapor storage and recovery apparatus includes first and second fuel vapor distribution chambers, wherein said second fuel vapor distribution chamber is arranged downstream said purge buffer zone and communicates with said purge port, both said first and said second fuel vapor storage compartment being not filled with adsorbent material.

Advantageously, the purge buffer zone forms part of the adsorbent filling of the main vapor storage compartment and said purge buffer zone is arranged at a downstream end portion of the main vapor storage compartment in a dead zone of adsorbent material during venting operation. "Dead zone" in this context means that the adsorbent material during the course of a normal venting operation of the fuel vapor storage and recovery apparatus is not or almost not passed by hydrocarbon-laden gas charged from the tank port.

One particularly useful embodiment of the fuel vapor storage apparatus according to the instant application is characterized in that the adsorbent material has a stepped configuration at said end portion of said main vapor storage compartment, an elevated portion thereof forming said purge buffer zone.

Said purge buffer zone may be in the form of a buffer ring at an end face of the adsorbent filling of said main vapor storage compartment. Ring in the sense of the instant application does not mean that the purge buffer zone necessarily has to have a circular cross section.

Said purge buffer zone may be defined by an inner wall of the second vapor storage compartment and by said partition wall of said fuel vapor distribution chamber.

The fuel vapor storage and recovery apparatus according to the invention disclosed herein may include one or more vapor storage compartments which may be connected in series. In a preferred embodiment, the fuel vapor storage and recovery apparatus comprises at least one further or secondary vapor storage compartment, which is connected in series with said main vapor storage compartment.

In order to fulfill restricted space requirements, said main and secondary vapor storage compartments may be arranged in concentric relationship to each other. The main vapor storage compartment may include a tubular adsorbent bed or tubular configuration enclosing a tubular or cylindrical inner channel forming a further adsorbent bed connected in series with a main adsorbent bed with said main vapor storage compartment.

One preferred embodiment in the following will be described with reference to the attached drawings, in which:

FIG. 1 shows a cross-section of a fuel vapor storage and recovery apparatus according to the invention, and FIG. 2 shows a perspective view of the bottom partition wall of the first air distribution chamber as well as of the intermediate partition wall within the first air distribution chamber.

A fuel vapor storage and recovery apparatus 1 according to the invention is illustrated in FIG. 1. The fuel vapor storage and recovery apparatus 1 includes a generally cylindrical housing 2, which encloses a main vapor storage compartment 3 as well as further vapor storage compartments 4, 5, 6. The housing includes a vapor inlet port 7, an atmospheric vent port 8, and a purge port 9.

All vapor storage compartments 3, 4, 5, and 6 are connected in series and the main vapor storage compartment 3 surrounds the second and third vapor storage compartment 4 and 5, i.e. the main vapor storage compartment 3 and the second and third vapor storage compartment 4 and 5 are arranged in concentric relationship to each other. The main vapor storage compartment 3 as well as the second and forth vapor storage compartments 4 and 6 are filled/packed with granular or pelletized activated coal as an adsorbent. The third vapor storage compartment 5 may be filled with a monolithic adsorbent material such as monolithic carbon. Additionally and/or alternatively, the third vapor storage compartment can include one or more purge heaters, or an heat exchanger.

During normal venting operation of the fuel vapor storage and recovery apparatus 1 according to the invention, fuel vapor from a tank line connected to the vapor inlet port 7 will be directed into a first fuel vapor distribution chamber 10, which has in the described preferred embodiment an annular shape and extends along the upstream end face of the main fuel vapor storage compartment 3. The first fuel vapor distribution chamber 10 is not filled or packed with any adsorbent material, i.e. is basically empty and communicates via porous structure 11 with the main vapor storage compartment 3. A porous structure within the meaning of the invention described herein may be a single structure, which is selfsupportingly stift or an assembly, which includes a support, e.g. a frame structure and a filter mesh. The porous structure 11 is provided by a sloping bottom partition wall of the first fuel vapor distribution chamber 10. The first fuel vapor distribution chamber comprises an outer wall 12, being part of the cylindrical housing 2 and an inner partition wall 13, which shields or seals a purge buffer zone 14 against the fuel vapor distribution chamber 10. Said purge buffer zone 14 surrounds said fourth vapor storage compartment 6.

It should be noted that instead of second and third and forth vapor storage compartments 4, 5, and 6 only one secondary or second vapor storage compartment could be present, which not necessarily has to be arranged in concentric relationship to the main vapor storage compartment 3.

As mentioned before, in the course of the normal venting operation, the hydrocarbon-laden gas is evenly distributed over the upstream face of the main vapor storage compartment 3 and will be passed through the main vapor storage compartment 3 into an air chamber 15 at the downstream end of the main vapor storage compartment 3.

This air chamber 15 is provided between a bottom plate 16 of the housing 2 and a porous structure 17 or bottom grid at the "downstream end" of the main vapor storage compartment 3. "Downstream" in this regard refers to the normal venting operation of the fuel vapor storage and recovery apparatus 1.

The second, third and forth vapor storage compartments 4, 5, and 6 are defined by tubular inserts 18, 19, which extend within housing 2 and are surrounded by the main vapor storage compartment 3. The tubular insert 18 includes cylindrical dividers 20, which cooperate with cylindrical dividers 20a of the bottom plate 16. More specifically, the cylindrical dividers 20a of a cap retainer 32 extend into gaps between the dividers 20 of the tubular insert 18, so as to form an extended air flow path, the length of which is determined by the amount of dividers 20 and 20a. The cap retainer 32 supports the porous structure 17. In this air flow path 21, the wholly or partially cleaned gas exiting the downstream end of the first vapor storage compartment is deviated several times in a 180° direction until it enters the second vapor storage compartment 4. The third vapor storage compartment 5 includes a cup-shaped insert 22, which also defines an extended winding air flow path or air flow gap 23, where the air flow is again deviated several times in a 180° direction until it enters the third vapor storage compartment 5.

Finally, at the very downstream end of the gas flow gap 23, there is a forth vapor storage compartment 6 provided which may also be packed with adsorbent material.

In the following, the purging function of the fuel vapor storage and recovery apparatus 1 will be described in more detail.

As mentioned in the very beginning, the housing 2 includes a purge port 9, which communicates with a second fuel vapor distribution chamber 24. The second fuel vapor distribution chamber 24 is also formed as an annular chamber, which is defined by an outer wall 25, an inner wall 26, and a bottom grid section 27. The bottom grid section 27 is a porous structure as mentioned before and is generally selfsupportingly rigid. The bottom grid section grid 27 may additionally support a filter mesh. The bottom grid section 27 at the same time defines an upstream face of the purge buffer zone 14. The outer wall 25 of the second fuel vapor distribution chamber is defined by an inner diameter of the partition wall 13.

The purge buffer zone 14 is not separated from the adsorbent filling of the main vapor storage compartment 3. A person skilled in the art will however appreciate that the purge buffer zone 14 may be separated by a porous member.

The bottom grid section 27 of the second fuel vapor distribution chamber 24 completely covers the downstream face of the purge buffer zone 14.

In the course of a purging operation, suction will be applied to the purge port 9 via an engine air intake line. This suction will be evenly applied to the entire cross section of the purge buffer zone 14 via second vapor distribution chamber 24. This causes in first instance a pressure drop at the vapor inlet port 7, so that at the very beginning of the purging operation fuel vapor will be drawn from the tank line via vapor inlet port into the first vapor distribution chamber 10. Of course, the fuel vapor initially tends to take the shortest route from the fuel vapor inlet port 7 to the purge part 9, however it is prevented from doing so by the partition wall 3, so that the fuel vapor has to pass the porous structure 11 and to enter into the main vapor storage compartment 3. From this upstream end of the main vapor storage compartment 3, the fuel-laden gas will enter the purge buffer zone 14 from below and thereby will be distributed evenly over the entire cross section of the purge buffer zone 14. From the purge buffer zone 14, the gas will then enter into the second fuel vapor distribution chamber 24, which completely extends over and communicates with the downstream face of the fuel buffer zone 14, so that the gas will be evenly distributed over the entire cross section of purge buffer zone 14.

As this can be taken from FIG. 1, said bottom partition wall 29 of said first fuel vapor distribution chamber 10 is sloping towards the periphery of the housing 2 and forms a sloping shoulder of the main vapor storage compartment. Due to this design, the first fuel vapor distribution chamber 10 in its bottom area has a triangular bottom cross-section and occupies a space which normally would form a carbon dead zone.

The bottom partition wall 29 includes a molded frame structure, which supports a screen or mesh.

The bottom wall 27 of the second fuel vapor distribution chamber 24 has a similar structure.

Said first fuel vapor distribution chamber 10 is divided into an upper 10a and a lower part 10b by a liquid trap ring 30 welded onto the inner partition wall 13, so that the upstream story of the first fuel vapor distribution chamber 10 acts as a liquid trap reservoir. The liquid trap ring 30 acts a droplet collector. Gas entering said upper part 10a of said first air distribution chamber 10 via vapor inlet port 7 will be directed to the lower part 10b of the air distribution chamber 10 through a slot 31 in the liquid trap ring 30.

The housing 2 of the fuel vapor storage and recovery apparatus 1 basically extends horizontally, so that the upper upstream part 10a of said first fuel vapor distribution chamber 10 defines a liquid volume and the liquid trap ring 30 with the slot 31 defining a winding path for the gas. It is to be understood that the slot 31 is arranged on a radius of the liquid trap ring 30, such that the liquid trap ring 30 in any event forms a barrier for liquid hydrocarbon eventually being collected in the upper part 10a of the first fuel vapor distribution chamber 10.

REFERENCE NUMERALS 1 fuel vapor storage and recovery apparatus
2 housing
3 main vapor storage compartment
4, 5, 6 second, third, and forth vapor storage compartments
7 vapor inlet port
8 atmospheric vent port
9 purge port
10 first fuel vapor distribution chamber
10a upper part of first fuel vapor distribution chamber
10b lower part of first fuel vapor distribution chamber
11 porous structure
12 outer wall
13 partition wall
14 purge buffer zone
15 air chamber
16 bottom plate
17 porous structure
18, 19 tubular inserts
20 dividers
20a dividers
21 air flow path
22 cup-shaped insert
23 airflow gap
24 second fuel vapor distribution chamber
25 outer wall
26 inner wall
27 bottom grid section
29 bottom partition wall of first fuel vapor distribution chamber
30 liquid trap ring
31 slot
32 cap retainer

What is claimed is:

1. A fuel vapor storage and recovery apparatus including:
    a housing defining at least one main vapor storage compartment filled with an adsorbent material,
    at least one vapor inlet port, said vapor inlet port being connectable to a fuel tank venting line,
    at least one atmospheric vent port, and
    at least one purge port, said purge port being connectable to an engine air intake line,
    wherein said main vapor storage compartment comprises a purge buffer zone including the adsorbent material, and at least one first fuel vapor distribution chamber not filled with the adsorbent material,
    wherein said first fuel vapor storage distribution chamber is arranged hydraulically upstream said purge buffer zone and directly communicates with said fuel vapor inlet port,
    wherein said first fuel vapor distribution chamber includes a liquid trap, wherein said liquid trap includes at least one droplet separator,
    wherein said droplet separator includes a circumferential intermediate partition wall within said first fuel vapor distribution chamber,
    wherein the first fuel vapor storage distribution chamber is annular, and
    wherein the circumferential intermediate partition wall divides the first fuel vapor storage distribution chamber into an upper annular chamber and a lower annular chamber.

2. The fuel vapor storage and recovery apparatus according to claim 1, wherein said first fuel vapor distribution chamber includes a circumferential bottom partition wall within the main vapor storage compartment, said bottom partition wall sloping towards the periphery of the housing.

3. The fuel vapor storage and recovery apparatus according to claim 2, wherein said bottom partition wall comprises a grid or frame structure.

4. The fuel vapor storage and recovery apparatus according to claim 3, wherein said grid or frame structure supports a screen, which is permeable to fuel vapor.

5. The fuel vapor storage and recovery apparatus according to claim 1, wherein the upper annular chamber and the lower annular chamber are in direct fluid communication.

6. The fuel vapor storage and recovery apparatus according to claim 1, wherein the circumferential intermediate partition wall forms a liquid trap ring.

7. The fuel vapor storage and recovery apparatus according to claim 1, wherein the purge buffer zone is enclosed by the first fuel vapor storage distribution chamber.

8. The fuel vapor storage and recovery apparatus according to claim 1, wherein the purge buffer zone is in the form of a buffer ring.

9. A fuel vapor storage and recovery apparatus including:
- a housing defining at least one main vapor storage compartment filled with an adsorbent material,
- at least one vapor inlet port, said vapor inlet port being connectable to a fuel tank venting line,
- at least one atmospheric vent port, and
- at least one purge port, said purge port being connectable to an engine air intake line,
- wherein said main vapor storage compartment comprises a purge buffer zone including the adsorbent material, and at least one first fuel vapor distribution chamber not filled with the adsorbent material,
- wherein said first fuel vapor storage distribution chamber is arranged hydraulically upstream said purge buffer zone and directly communicates with said fuel vapor inlet port,
- wherein said first fuel vapor distribution chamber includes a liquid trap, wherein said liquid trap includes at least one droplet separator,
- wherein said droplet separator includes a circumferential intermediate partition wall within said first fuel vapor distribution chamber, and
- wherein the purge buffer zone is enclosed by the first fuel vapor storage distribution chamber.

10. The fuel vapor storage and recovery apparatus according to claim 9, wherein said first fuel vapor distribution chamber includes a circumferential bottom partition wall within the main vapor storage compartment, said bottom partition wall sloping towards the periphery of the housing.

11. The fuel vapor storage and recovery apparatus according to claim 10, wherein said bottom partition wall comprises a grid or frame structure.

12. The fuel vapor storage and recovery apparatus according to claim 11, wherein said grid or frame structure supports a screen, which is permeable to fuel vapor.

13. The fuel vapor storage and recovery apparatus according to claim 9, wherein the first fuel vapor storage distribution chamber is annular.

14. The fuel vapor storage and recovery apparatus according to claim 9, wherein the circumferential intermediate partition wall divides the first fuel vapor storage distribution chamber into an upper annular chamber and a lower annular chamber.

15. The fuel vapor storage and recovery apparatus according to claim 14, wherein the upper annular chamber and the lower annular chamber are in direct fluid communication.

16. The fuel vapor storage and recovery apparatus according to claim 9, wherein the circumferential intermediate partition wall forms a liquid trap ring.

17. The fuel vapor storage and recovery apparatus according to claim 9, wherein the purge buffer zone is in the form of a buffer ring.

18. A fuel vapor storage and recovery apparatus including:
- a housing defining at least one main vapor storage compartment filled with an adsorbent material,
- at least one vapor inlet port, said vapor inlet port being connectable to a fuel tank venting line,
- at least one atmospheric vent port, and
- at least one purge port, said purge port being connectable to an engine air intake line,
- wherein said main vapor storage compartment comprises a purge buffer zone including the adsorbent material, and at least one first fuel vapor distribution chamber not filled with the adsorbent material,
- wherein said first fuel vapor storage distribution chamber is arranged hydraulically upstream said purge buffer zone and directly communicates with said fuel vapor inlet port,
- wherein said first fuel vapor distribution chamber includes a liquid trap, wherein said liquid trap includes at least one droplet separator,
- wherein said droplet separator includes a circumferential intermediate partition wall within said first fuel vapor distribution chamber,
- wherein said first fuel vapor distribution chamber includes a circumferential bottom partition wall within the main vapor storage compartment, said bottom partition wall sloping towards the periphery of the housing.

19. The fuel vapor storage and recovery apparatus according to claim 18, wherein said bottom partition wall comprises a grid or frame structure.

20. The fuel vapor storage and recovery apparatus according to claim 19, wherein said grid or frame structure supports a screen, which is permeable to fuel vapor.

* * * * *